(12) United States Patent
Kakibe et al.

(10) Patent No.: US 9,136,515 B2
(45) Date of Patent: Sep. 15, 2015

(54) HEAT-RESISTANT MICROPOROUS FILM AND BATTERY SEPARATOR

(75) Inventors: Akiko Kakibe, Miyagi (JP); Sung-kil Lee, Miyagi (JP); Kazuhiro Okamoto, Miyagi (JP)

(73) Assignee: Sony Corporation, Tokyo (JP)

( * ) Notice: Subject to any disclaimer, the term of this patent is extended or adjusted under 35 U.S.C. 154(b) by 886 days.

(21) Appl. No.: 13/293,683

(22) Filed: Nov. 10, 2011

(65) Prior Publication Data

US 2012/0202102 A1     Aug. 9, 2012

(30) Foreign Application Priority Data

Nov. 17, 2010   (JP) .................................. 2010-257347

(51) Int. Cl.
| | |
|---|---|
| H01M 2/14 | (2006.01) |
| H01M 2/16 | (2006.01) |
| H01M 2/18 | (2006.01) |
| H01M 10/42 | (2006.01) |
| H01M 10/052 | (2010.01) |

(52) U.S. Cl.
CPC .............. *H01M 2/145* (2013.01); *H01M 2/166* (2013.01); *H01M 2/1686* (2013.01); *H01M 2/18* (2013.01); *H01M 10/4235* (2013.01); *H01M 10/052* (2013.01); *Y10T 428/24372* (2015.01)

(58) Field of Classification Search
CPC ... H01M 2/1686; H01M 2/166; H01M 2/145; H01M 2/18; H01M 10/4235; H01M 10/052
See application file for complete search history.

(56) References Cited

U.S. PATENT DOCUMENTS

| | | |
|---|---|---|
| 2007/0264577 A1 | 11/2007 | Katayama et al. |
| 2009/0067119 A1 | 3/2009 | Katayama et al. |
| 2010/0203396 A1 | 8/2010 | Murata |

FOREIGN PATENT DOCUMENTS

| | | | | |
|---|---|---|---|---|
| CN | 101687404 | 3/2010 | | |
| JP | 2005-171230 | 6/2005 | | |
| JP | 2007-005158 | 1/2007 | | |
| JP | 2007-280911 | 10/2007 | | |
| JP | 2008-123996 | * 5/2008 | ............. | H01M 2/16 |
| JP | 2009-238752 | 10/2009 | | |
| JP | 2009-283273 | 12/2009 | | |
| WO | 00/79618 | 12/2000 | | |
| WO | 2006/061936 | 6/2006 | | |
| WO | 2009/044741 | 4/2009 | | |

OTHER PUBLICATIONS

Japanese Office Action issued May 20, 2014, for corresponding Japanese Appln. No. 2010-257347.
Chinese Office Action issued Dec. 2, 2014, for corresponding Chinese Appln. No. 201110354115.7.

* cited by examiner

*Primary Examiner* — Raymond Alejandro
(74) *Attorney, Agent, or Firm* — K&L Gates LLP

(57) ABSTRACT

A heat-resistant microporous film and a battery separator are provided, which each include a substrate formed by using a porous film and include a heat-resistant layer formed on at least one surface of the substrate so as to contain a heat-resistant resin and heat-resistant particles, and in which a protrusion is formed on a surface of the heat-resistant layer in number not exceeding 60 per surface area of 0.0418 mm$^2$ and has an area not exceeding 500 μm$^2$ per surface area of 0.0418 mm$^2$ in a direction normal to a surface of the heat-resistant layer, the protrusion being formed as a result of aggregation of the heat-resistant particles and having a height of at least twice the average particle size of the heat-resistant particles with reference to the height average surface of the heat-resistant layer.

24 Claims, 5 Drawing Sheets

1

50.00 μm/div

HEAT-RESISTANT MICROPOROUS FILM AND BATTERY SEPARATOR

CROSS REFERENCES TO RELATED APPLICATIONS

The present application claims priority to Japanese Patent Application No. 2010-257347 filed on Nov. 17, 2010, the disclosure of which is incorporated herein by reference.

BACKGROUND

The present disclosure relates to a heat-resistant microporous film having a heat-resistant insulating layer, particularly relates to a heat-resistant microporous film and a battery separator each having a substrate and a heat-resistant layer, the substrate being made by using a polyolefin resin, and the heat-resistant layer having a structure in which inorganic particles are contained in a heat-resistant resin.

In recent years, portable electronic information apparatuses such as mobile telephones, camcorders, and notebook computers have been widely used, and such apparatuses have been therefore developed so as to have enhanced performance, reduced size, and reduced weight. These apparatuses each have a power source such as a primary battery which is disposable or a secondary battery which can be repeatedly used. In terms of good total balance in enhancement of performance, reduction in size and weight, and economic efficiency, demand for the secondary battery, particularly a lithium ion secondary battery, has been increased. In addition, in such apparatuses, the enhancement of performance and the reduction in size are further developed, and the lithium ion secondary battery is accordingly desired to also have increased energy density.

In the lithium ion secondary battery, the increase of the capacitance thereof causes energy density to be increased, and reliability in the case where large quantity of energy is released during heat emission from the battery and during the occurrence of internal short circuit is therefore significantly desired to be increased. Development of a lithium ion secondary battery which has both high reliability for such unusual situations and high capacitance is accordingly remarkably demanded.

In general, the lithium ion secondary battery has a cathode containing a lithium composite oxide, an anode containing a material which can receive and emit lithium ions, a separator disposed between the cathode and the anode, and a non-aqueous electrolyte solution. The cathode and anode are stacked with interposing the separator therebetween, or the cathode and anode are stacked and are then wound to form a column-like wound electrode. The separator has functions of electrically isolating the cathode from the anode and preserving the non-aqueous electrolyte solution. In general, a polyolefin microporous film is used as the separator of the lithium ion secondary battery having such a structure.

The polyolefin microporous film has excellent electrical insulating properties and excellent ion permeability and is therefore widely used as the separator of the lithium ion secondary battery and a capacitor. The lithium ion secondary battery exhibits high output density and high capacitance density. In contrast, in the case where unusual situations such as short circuit and overcharge occur, which cause heat emission, an organic solvent used for the non-aqueous electrolyte solution causes the non-aqueous electrolyte solution to be decomposed with the aid of the emitted heat, and fire therefore may occur in the worst cases. The lithium ion secondary battery has some safety functions to prevent such problematic phenomenon, and a shutdown function of the separator is one of such functions.

In the shutdown function of the separator, the micropores of the separator are filled with, for example, a thermally fused resin material during abnormal heat emission from the battery with the result that conduction of ions contained in the non-aqueous electrolyte solution is suppressed, and the advance of an electrochemical reaction is stopped. In general, the lower the shutdown temperature is, the higher the safety is. An appropriate shutdown temperature provided by polyethylene is one of the reasons for using polyethylene as a component of the separator. In order to form pores and increase toughness, a resin film which has been uniaxially or biaxially stretched is used as the separator.

Meanwhile, the porous separator produced in the above manner is stretched and therefore has strain. In the case where the porous separator is exposed to a high temperature environment, the porous separator problematically shrinks resulting from residual stress. The shrinkage of the separator causes secondary problems such as the occurrence of internal short circuit in some cases.

A technique is proposed in Japanese Unexamined Patent Application Publication No. 2008-123996, in which a traditional separator is provided in the form of a composite film to secure safety in a battery against the thermal shrinkage of the separator and to enhance reliability for the occurrence of internal short circuit due to various causes with the result that the problem of the shrinkage in high temperature environment is overcome.

SUMMARY

Meanwhile, because the lithium ion secondary battery has been used in various application fields in recent years, a battery property such as further high capacitance is demanded. In view of thermal shrinkage properties, a further thin heat-resistant microporous film having such a property is accordingly desired to be developed.

Study for embodiments of the present disclosure has been made in view of disadvantages in the related art. It is desirable to provide a heat-resistant microporous film and battery separator, in which the occurrence of thermal shrinkage is suppressed without the increase of the thickness of a heat-resistant layer.

According to an embodiment of the present disclosure, there is provided a heat-resistant microporous film and battery separator each including a substrate which is formed by using a porous film and including a heat-resistant layer which is formed on at least one surface of the substrate and which contains a heat-resistant resin and heat-resistant particles. A protrusion is formed on a surface of the heat-resistant layer in number not exceeding 60 per surface area of 0.0418 $mm^2$ and has an area of 500 $\mu m^2$ per surface area of 0.0418 $mm^2$ in a direction normal to a surface of the heat-resistant layer, the protrusion being formed as a result of aggregation of the heat-resistant particles and having a height of at least twice the average particle size of the heat-resistant particles with reference to the height average surface of the heat-resistant layer.

The number of the protrusions formed as coarse aggregates of the heat-resistant particles can be reduced in the heat-resistant microporous film and battery separator of the embodiment of the present disclosure. The protrusion projects from a surface of the heat-resistant layer and is made from the heat-resistant particles which are less likely to contribute to a heat-resistant effect. The number of such protrusions is reduced, thereby being able to increase the number of heat-resistant particles which contribute to inhibition of the thermal shrinkage even in the case where the heat-resistant particle content is not changed.

According to embodiments of the present disclosure, the number of the heat-resistant particles which contribute to inhibition of the thermal shrinkage can be increased, and thermal resistance can be therefore maintained without the increase in the heat-resistant particles content or the thickness of the heat-resistant layer.

Additional features and advantages are described herein, and will be apparent from the following Detailed Description and the figures.

DETAILED DESCRIPTION

Figure 1:
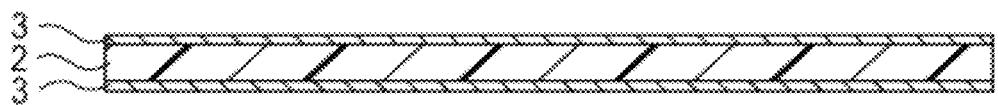
FIG. 1 is a sectional view illustrating an example of the configuration of a heat-resistant microporous film according to an embodiment of the present disclosure.

Embodiments of the present application will be described below in detail with reference to the drawings. In this case, description is made as follows:
1. first embodiment (an example of a heat-resistant microporous film of the present disclosure)
2. second embodiment (an example of a battery using the heat-resistant microporous film of the present disclosure)
1. First Embodiment In the first embodiment, a heat-resistant microporous film 1 has a structure in which a heat-resistant layer containing a heat-resistant resin and heat-resistant particles is formed on at least one surface of a substrate layer and in which aggregates of the heat-resistant particles are formed in a certain number or smaller so as to project from a surface of the heat-resistant layer. The heat-resistant microporous film 1 is not only applied to a separator of a battery but can be applied to an ordinary heat-resistant resin film. The heat-resistant microporous film 1 of embodiments of the present disclosure will be herein after described in detail.
1-1. Configuration of Heat-Resistant Microporous Film With reference to FIG. 1, the heat-resistant microporous film 1 of the first embodiment has a substrate 2 and heat-resistant layers 3, the substrate 2 being formed by using a microporous film with high strength, and the heat-resistant layers 3 having excellent thermal resistance and shrinkage resistance. The heat-resistant layer 3 may be formed at least one surface of the substrate 2. In the case where the heat-resistant microporous film 1 is applied to a battery, namely used as a separator, the heat-resistant microporous film 1 functions to isolate a cathode from an anode in the battery with the result that short circuit of electric current is prevented from being caused resulting from contact of the two electrodes, thereby transporting lithium ions.

Substrate Layer

The substrate 2 is porous resin film including an insulating thin film with high ion permeability and certain mechanical strength. Preferred examples of such a resin material include polyolefin-based synthetic resins such as polypropylene (PP) and polyethylene (PE), an acrylic resin, a styrene resin, a polyester resin, and a nylon resin. In particular, in terms of appropriate melting temperature and ready availability, polyethylene such as low-density polyethylene (LDPE), high-density polyethylene (HDPE), linear polyethylene; low-molecular-weight-wax thereof; and polyolefin resins such as polypropylene are preferably employed. Alternatively, a structure in which porous films individually formed by using at least two of such materials are stacked may be employed, or a porous film which is formed as a result of fusing and kneading two or more resin materials may be employed. A structure including a polyolefin-based porous film excellently functions to isolate a cathode from an anode, thereby being able to further decrease the occurrence of internal short circuit and open-circuit voltage.

The configuration of the substrate 2 can be appropriately determined as long as the substrate 2 has a thickness sufficient to maintain a predetermined strength. In the case where the heat-resistant microporous film 1 is used as a battery separator, the substrate 2 preferably serves to isolate a cathode from an anode and to prevent the occurrence of short circuit. In addition, the substrate 2 preferably has ion permeability to desirably promote a battery reaction through the heat-resistant microporous film 1 and is configured so as to have a thickness which enables the volumetric efficiency of an active material layer to be increased as possible, the active material layer contributing to a battery reaction in the battery. In particular, the substrate 2 has a thickness that is preferably in the range from 12 μm to 20 μm. In order to exhibit the above ion permeability, the substrate 2 has a porosity that is preferably in the range from 40% to 50%.

Heat-Resistant Layer

The heat-resistant layer 3 is formed on at least one surface of the substrate 2 and contains a heat-resistant resin and heat-resistant particles. In the case where the heat-resistant microporous film 1 is provided in a battery, the heat-resistant microporous film 1 is placed such that the heat-resistant layer 3 at least faces a cathode, in other words, such that the heat-resistant layer 3 is positioned between a cathode and the substrate 2. Although the heat-resistant layer 3 contains the heat-resistant particles, the heat-resistant layer 3 serves as a functional layer in which the heat-resistant particles do not cause the clogging of micropores formed in the substrate 2.

Any material which exhibits an intended thermal resistance in the application to ordinary resin films can be used for the heat-resistant resin. The heat-resistant layer 3 is formed to protect the substrate 2 formed by using a resin material with mechanical strength and has a melting point higher than that of the resin material used to form the substrate 2. Meanwhile, in the case where the heat-resistant microporous film 1 of this embodiment is used as a battery separator, a resin material which is insoluble in a non-aqueous electrolyte solution in the battery and is electrochemically stable within a range of use of the battery is preferably used.

Examples of the heat-resistant resin include polyolefin materials such as polyethylene and polypropylene; fluorine-containing resins such as polyvinylidene fluoride (PVdF) and polytetrafluoroethylene (PTFE); fluorine-containing rubbers such as a vinylidene fluoride-hexafluoropropylene-tetrafluoroethylene copolymer, vinylidene fluoride-tetrafluoroethylene copolymer, and ethylene-tetrafluoroethylene copolymer; rubbers such as a styrene-butadiene copolymer and hydride thereof, acrylonitrile-butadiene copolymer and hydride thereof, acrylonitrile-butadiene-styrene copolymer and hydride thereof, methacrylate-acrylate copolymer, styrene-acrylate copolymer, acrylonitrile-acrylate copolymer, ethylene propylene rubber, polyvinyl alcohol, and vinyl polyacetate; cellulose derivatives such as ethyl cellulose, methyl cellulose, hydroxyethyl cellulose, and carboxymethyl cellulose; and resins having at least any one of a melting point of 180° C. or higher and a glass transition point of 180° C. or higher, such as polyphenylene ether, polysulfone, polyether sulfone, polyphenylene sulfide, polyether imide, polyamide imide, polyamide, and polyester.

Among these, polyvinylidene fluoride is preferably employed as the heat-resistant resin. Examples of commercially available polyvinylidene fluoride to be used include KF polymers (registered trademark) W#9300, W#9200, and W#9100, each being produced by KUREHA CORPORATION.

Examples of the heat-resistant particles include electrically insulating inorganic particles such as metallic oxides, metallic nitrides, and metallic carbides. Preferred examples of the metallic oxides to be used include alumina ($Al_2O_3$), magnesia (MgO), titania ($TiO_2$), zirconia ($ZrO_2$), and silica ($SiO_2$). Preferred examples of the metallic nitride to be used include silicon nitride ($Si_3N_4$), aluminum nitride (AlN), boron nitride (BN), and titanium nitride (TiN). Preferred examples of the metallic carbides to be used include silicon carbide (SiC) and boron carbide ($B_4C$).

These inorganic particles used as the heat-resistant particles may be used alone or in combination of two or more. The heat-resistant particles have oxidation resistance. In the case where the heat-resistant microporous film is used as a battery separator, the heat-resistant particles exhibit strong resistance to an oxidation environment in the vicinity of an electrode, particularly a cathode during charging. The shape of the heat-resistant particles is not specifically limited. The heat-resistant particles may have any of a spherical shape, fibrous form, and random geometry and preferably have a spherical shape in particular.

In terms of influence on the strength of a separator and smoothness of a coated surface, primary particles in the heat-resistant particles preferably have an average particle size of several micrometers or smaller. In particular, the primary particles have an average particle size of preferably 1.0 μm or smaller, more preferably in the range from 0.3 μm to 0.8 μm. The average particle size of primary particles can be measured as a result of analyzing an electron micrograph with a particle size analyzer.

In the case where the primary particles in the heat-resistant particles have an average particle size exceeding 1.0 μm, a separator may become fragile, and a coated surface may come to have a rough profile. In the case where the heat-resistant layer 3 containing heat-resistant particles is formed on the substrate 2 in the manner of coating, heat-resistant particles with excessively large primary particles cause a fear in which a coating liquid containing such heat-resistant particles is not partially applied.

The heat-resistant particles are preferably contained in the heat-resistant layer 3 in an amount that is in the range from 80 volume % to 90 volume %. In the case where the heat-resistant particles are contained in an amount less than 80 volume %, the thermal resistance, oxidation resistance, and shrinkage resistance of the heat-resistant layer 3 are decreased. In the case where the heat-resistant particles are contained in an amount greater than 90 volume %, difficulty arises in the formation of the heat-resistant layer 3, and such an amount is not therefore preferable.

In the heat-resistant layer 3, the heat-resistant particles contained in the heat-resistant layer 3 are effectively and uniformly dispersed. The effective dispersion of the heat-resistant particles means that the number of protrusions formed as a result of aggregation of the heat-resistant particles is reduced as possible. The protrusion formed as a coarse aggregate which has been developed as a result of aggregation of a large number of the heat-resistant particles projects from the heat-resistant layer 3 and does not contribute to the thermal resistance of the heat-resistant layer 3. Because the heat-resistant particles are locally aggregated into the protrusion, a proportion in which the heat-resistant particles are dispersed in an area other than the protrusion is smaller than a proportion in which the heat-resistant particles are contained in the heat-resistant layer 3. In this case, as compared with the case in which the heat-resistant particles are uniformly dispersed in an actual content proportion, thermal resistance is decreased. In the cases where the number of protrusions is excessively large and where the protrusions are formed in a small number while having a large size, thermal resistance is decreased.

In the case where the heat-resistant microporous film 1 is used as a battery separator, the protrusion itself damages a cathode active material layer or anode active material layer which is positioned so as to face the protrusion, and the cathode active material layer or anode active material layer may be removed or flaked. In this case, because the size of the active material layer which contributes to a battery reaction is reduced, battery performance is therefore decreased. Furthermore, in the case where the active material layer is flaked, a flaked piece of the active material layer damages the heat-resistant microporous film 1, and short circuit may be caused.

In the heat-resistant layer 3 of this embodiment, the heat-resistant particles are effectively and uniformly dispersed, and aggregation of the heat-resistant particles is reduced. In particular, the heat-resistant layer 3 is defined as follows: the heat-resistant layer 3 has the protrusions in number not exceeding 60 per 0.0418 $mm^2$ in a surface area of the heat-resistant layer 3; and the protrusions have an area not exceeding 500 $\mu m^2$ per 0.0418 $mm^2$ in a surface area of the heat-resistant layer 3 in a direction normal to a surface of the heat-resistant layer 3. The former definition indicates that the protrusions are formed in a reduced number, and the latter definition indicates that the protrusions are formed in a small magnitude in total. In this case, because the protrusion does not contribute to thermal resistance in the heat-resistant layer 3, the protrusion is determined as an aggregate of the heat-resistant particles and has a height twice the average particle size of the heat-resistant particles with reference to the height average surface of the heat-resistant layer 3. The height average surface of the heat-resistant layer 3 refers to an average height of a measured surface, in other words, the average thickness of the heat-resistant layer 3 within the above range of the surface area.

The number and area of the protrusions can be measured with, for example, a three-dimensional non-contact surface profile-measuring system. In this measurement, the three-dimensional surface profile of the heat-resistant layer 3 is measured, and the number of the protrusions and the area of the protrusions viewed from the top of the heat-resistant layer 3 are measured, the protrusions projecting from the height average surface within the range of a 0.0418 $mm^2$ area at a height twice the average particle size of the heat-resistant particles.

Examples of an apparatus to be used in such measurement include a surface profile-measuring system (Surface Explorer type SX-520DR commercially available from Ryoka Systems Inc.). With this system, the three-dimensional profile data of a surface of the separator is first analyzed in a wave operation mode. In this case, a 20-poser objective lens can be used to analyze the surface profile in an area of 0.0418 mm$^2$ (237 μm×176.5 μm). An analysis program "particle analysis" of an analysis software SX-Viewer is executed to the obtained data. Through these processes, on the basis of an appropriate height from a height average surface, in other words, height at least twice the average particle size of the heat-resistant particles in this embodiment, a portion lower than that and a portion higher than that are discriminated as a result of binarization, thereby being able to display an image projected to a plane. In this manner, the area and number of the protrusions can be measured from the image projected to a plane.

Figure 2A:
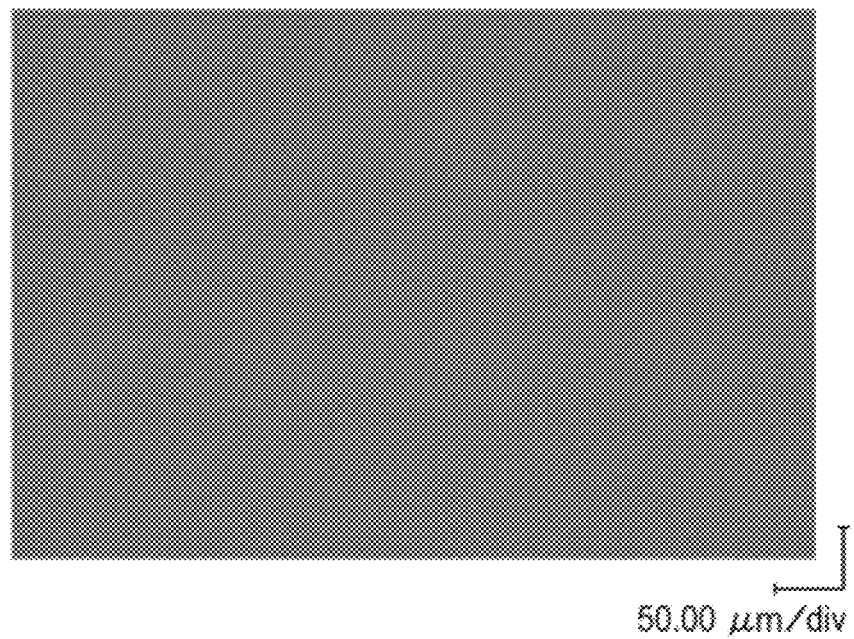
FIGS. 2A and 2B are images illustrating the surface profile of a heat-resistant microporous film according to an embodiment of the present disclosure, the surface profile being measured with a surface profile-measuring system.
Figure 2B:
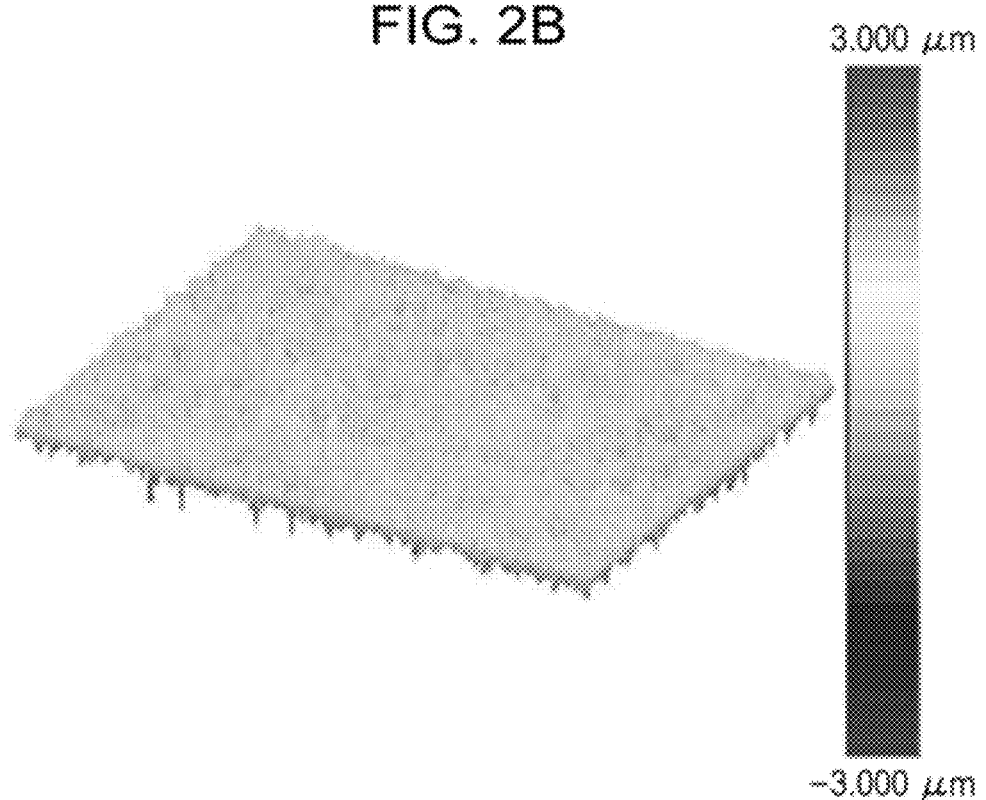

FIG. 2A is a top-view image illustrating the heat-resistant layer 3 of the heat-resistant microporous film 1 of this embodiment, the heat-resistant layer 3 being analyzed with the above surface profile-measuring system so as to be viewed from the top thereof. FIG. 2B is an image illustrating the three-dimensional surface profile of the heat-resistant layer 3 of the heat-resistant microporous film 1 in FIG. 2A. As is obvious from FIGS. 2A and 2B, in the heat-resistant microporous film 1 of this embodiment, the protrusions which are formed on a surface of the heat-resistant layer 3 as a result of aggregation of the heat-resistant particles and which protrude from the height average surface so as to have a height twice the average particle size of the heat-resistant particles are not substantially observed. The heat-resistant layer 3 therefore has high surface flatness and is accordingly preferable.

Figure 3A:
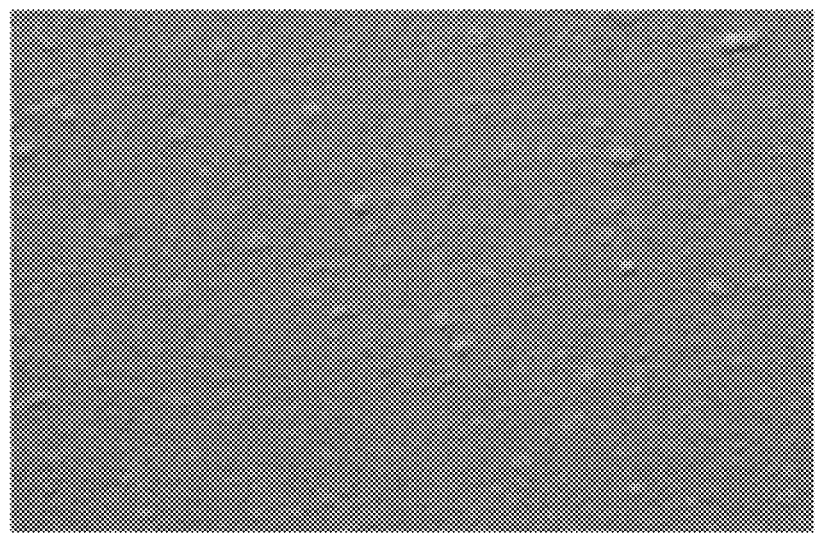
FIGS. 3A and 3B are images illustrating the surface profile of another heat-resistant microporous film, the surface profile being measured with a surface profile-measuring system.
Figure 3B:
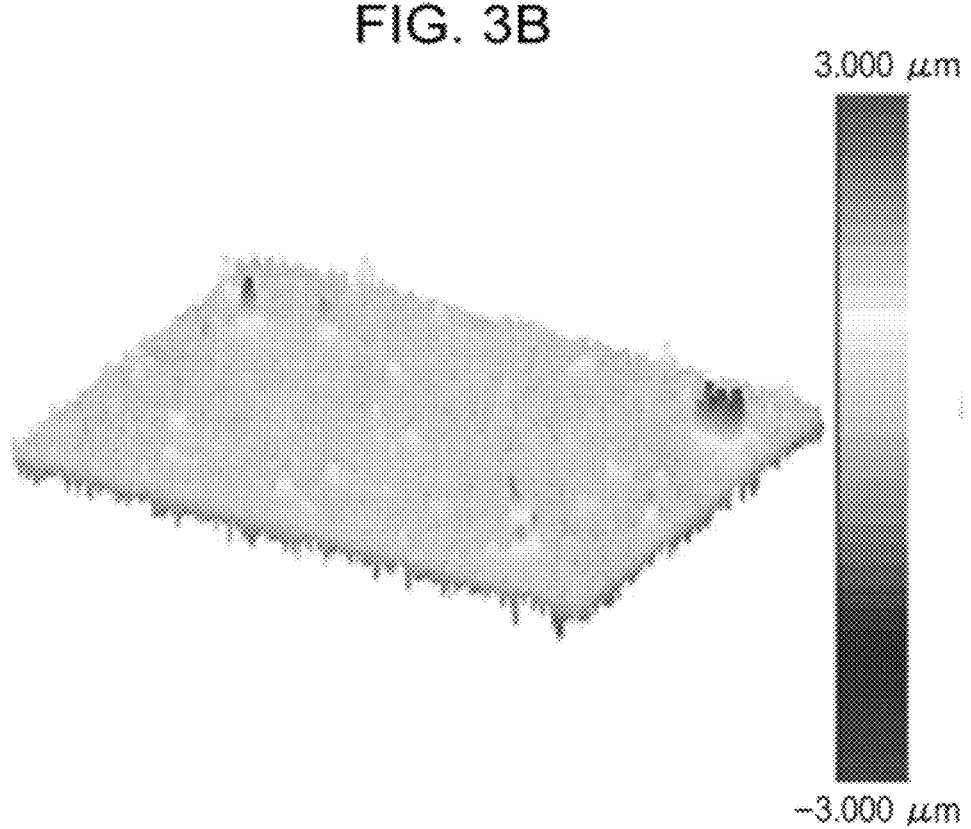

FIG. 3A is a top-view image illustrating a heat-resistant microporous film having a surface layer with protrusions which are formed as a result of aggregation of heat-resistant particles, the heat-resistant microporous film being analyzed so as to be viewed from the top thereof. FIG. 3B is an image illustrating the three-dimensional surface profile of the surface layer of the heat-resistant microporous film in FIG. 3A. In the example of FIGS. 3A and 3B, the surface layer is formed by using the heat-resist particles the same as those in the heat-resistant layer 3 illustrated in FIGS. 2A and 2B. Such protrusions may be formed resulting from, for example, insufficiently stirring each material used for the surface layer during the formation of the surface layer. A process for forming the surface layer will be hereinafter described.

The heat-resistant layer 3 may have an appropriate structure as long as the heat-resistant layer 3 at least has a thickness which imparts a predetermined thermal resistance. In terms of thermal shrinkage, the heat-resistant layer 3 preferably has a thickness at least six times the average particle size of the heat-resistant particles. By virtue of such a thickness, the heat-resistant particles are less likely to be aggregated into the protrusion.

In view of the case in which the heat-resistant microporous film 1 is used as a battery separator, the heat-resistant layer 3 serves to isolate a cathode from an anode, exhibits thermal resistance adequate to the separator, exhibits ion permeability which enables a battery reaction through the heat-resistant microporous film 1 to be desirably advanced, and has a thickness which enables the volume efficiency of an active material layer to be increased as possible, the active material layer contributing to the battery reaction in the battery. In particular, the heat-resistant layer 3 preferably has a thickness that is in the range from 3 μm to 6 μm. In addition, in order to exhibit the above ion permeability, the heat-resistant layer 3 preferably has porosity that is in the range from 60% to 70%.

In the heat-resistant layer 3 of this embodiment in which the protrusions are formed as coarse aggregates of the heat-resistant particles on the heat-resistant resin in a small number, the heat-resistant particles are effectively and uniformly dispersed as described above. Thermal resistance can be therefore maintained without increase in the thickness of the heat-resistant layer. Furthermore, in the heat-resistant layer 3, clay mineral may be dispersed together with the heat-resistant particles. The clay mineral is additionally contained with the result that the adhesion of the substrate 2 to the heat-resistant layer 3 is increased owing to interaction which acts between the clay mineral and each of the heat-resistant resin and heat-resistant particles, thereby further suppressing thermal shrinkage of the heat-resistant microporous film 1.

2. Production Process of Heat-Resistant Microporous Film

First, the heat-resistant resin is mixed with a dispersion solvent such as N-methyl-2-pyrrolidone (NMP) in a predetermined weight ratio, and the heat-resistant resin is then sufficiently dissolved in N-methyl-2-pyrrolidone, thereby producing a heat-resistant resin solution in which the heat-resistant resin is dissolved. The heat-resistant fine particles of, for example, alumina are subsequently added to the heat-resistant resin solution in a predetermined amount, and the resultant product is then stirred with an apparatus having high stirring properties, such as bead mill, thereby producing application slurry.

In this case, examples of the dispersion solvent to be used include N-methyl-2-pyrrolidone, dimethylacetamide, dimethylformamide, dimethylsulfoxide, and toluene. In terms of solubility and high dispersibility, N-methyl-2-pyrrolidone is preferably employed.

A coating apparatus such as a table coater is then used to apply the application slurry onto a surface of the substrate 2. The resultant product is immersed into a water bath for a predetermined time period to cause phase separation in the heat-resistant resin and is then dried by the blowing of hot air, thereby forming the heat-resistant layer 3. The heat-resistant layer 3 is also formed on the other surface of the substrate 2 through the same processes, where appropriate. The substrate 2 is produced, for example, as a result of forming a sheet-like polyolefin resin into a microporous film by uniaxially or biaxially stretching. Through these processes, the heat-resistant microporous film 1 can be produced, which has the heat-resistant layer 3 as a resin layer in which the heat-resistant particles are supported.

2. Second Embodiment

In the second embodiment, a non-aqueous electrolyte battery is provided, in which the heat-resistant microporous film 1 of the first embodiment is used as a battery separator.

2-1. Configuration of Non-aqueous Electrolyte Battery

Figure 4:
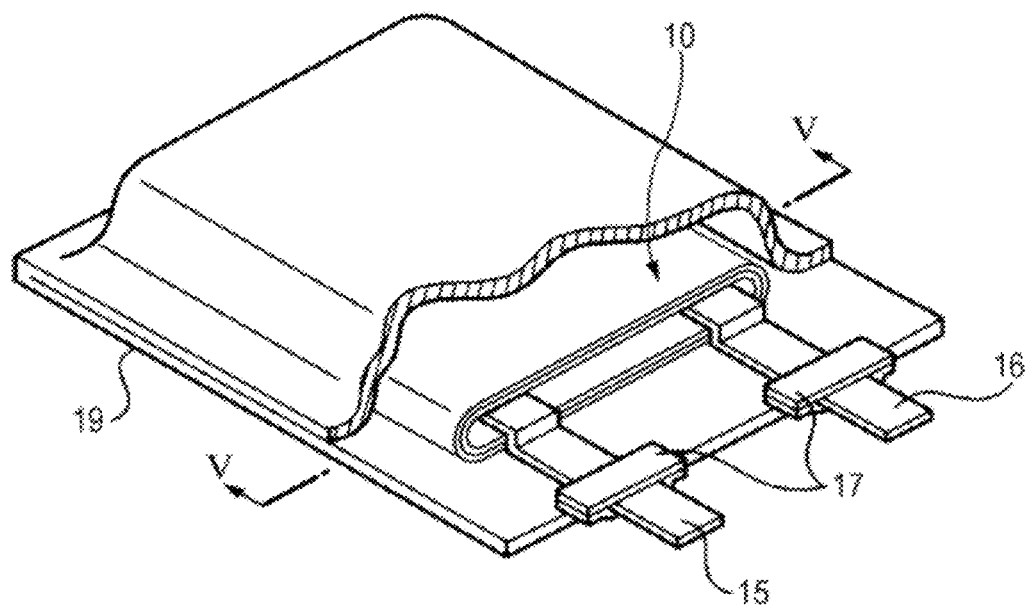
FIG. 4 is a perspective view illustrating an example of the configuration of a non-aqueous electrolyte battery according to a second embodiment of the present disclosure.
Figure 5:
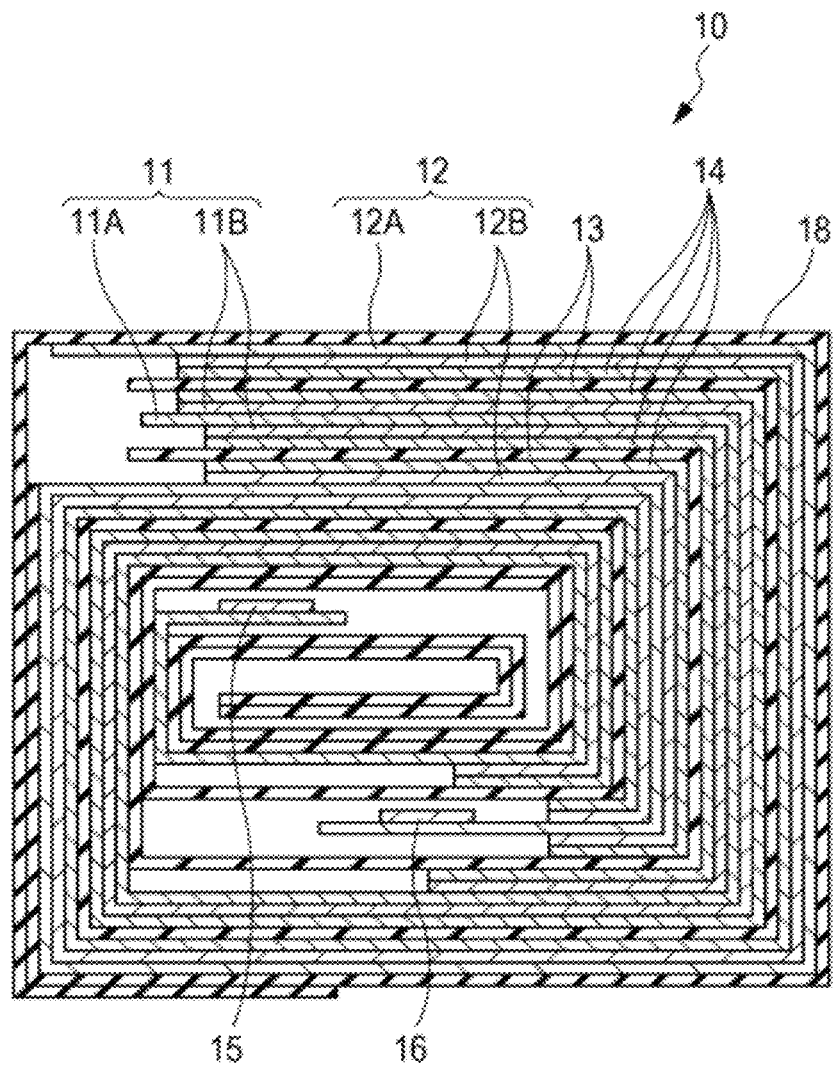
FIG. 5 is a sectional view illustrating the configuration of an electrodes-stacked structure of the non-aqueous electrolyte battery according to the second embodiment of the present disclosure.

FIG. 4 is a perspective view illustrating an example of the configuration of a non-aqueous electrolyte battery of the second embodiment of the present disclosure. FIG. 5 is a sectional view illustrating the configuration of an electrodes-stacked structure of the non-aqueous electrolyte battery of the second embodiment of the present disclosure (sectional view taken along a line V-V in FIG. 4).

The non-aqueous electrolyte battery 20 has a structure in which a cathode lead 15 and an anode lead 16 are connected to a wound electrode body 10 and in which the wound electrode body 10 is accommodated in a film-like exterior member 19. The non-aqueous electrolyte battery 20 has a planar shape. Each of the cathode lead 15 and the anode lead 16 has, for example, a strip shape and extends from the inside of the exterior member 19 to the outside, for example, in the same direction. The cathode lead 15 is formed by using a metallic material such as aluminum (Al). The anode lead 16 is formed by using a metallic material such as nickel (Ni).

Exterior Member

The exterior member 19 is a laminate film, for example, having a structure in which a thermally fusing layer, metallic layer, and outer resin layer are stacked in sequence and are then allowed to adhere to each other by lamination. In the exterior member 19, for example, the thermally fusing layer serves as the innermost layer, and the other layers adhere to each other by thermal fusing or by using an adhesive so as to overlie the innermost layer.

Examples of a material used for the thermally fusing layer include polyolefin resins such as polyethylene, polypropylene, modified polyethylene, modified polypropylene, and copolymers thereof. Such materials are employed for the reasons that water permeability can be decreased and that excellent airtightness is exhibited. Examples of a material used for the metallic film include foil-like or plate-like aluminum, stainless steel (SS), nickel, and iron. The outer resin layer may be formed by using the same resin as used for the thermally fusing layer or may be formed by using a material such as nylon, for example. Such a material is used for the outer resin layer for the reason that toughness against breakage and stab can be enhanced. The exterior member 19 may include a layer other than the thermally fusing layer, metallic layer, and outer resin layer.

Adhesion films 17 are provided between the exterior member 19 and each of the cathode lead 15 and anode lead 16 to enhance airtightness between the inside of the exterior member 19 and each of the cathode lead 15 and anode lead 16 and to prevent air intrusion. A material used for the adhesion films 17 exhibits adhesiveness to the cathode lead 15 and anode lead 16. In the case where the cathode lead 15 and anode lead 16 individually formed by using the above metallic materials, the adhesion films 17 are preferably formed by using polyolefin resins such as polyethylene, polypropylene, modified polyethylene, and modified polypropylene.

FIG. 5 is a sectional view illustrating the wound electrode body 10 taken along the line IV-IV in FIG. 4. In the wound electrode body 10, a cathode 11 and anode 12 are stacked so as to interpose a separator 13 and an electrolyte layer 14 as a non-flowing non-aqueous electrolyte therebetween, and such a stacked structure is wound. A protection tape 18 is attached to the outermost periphery of the wound structure, thereby maintaining a wound state. The heat-resistant microporous film 1 of the first embodiment is used as the separator 13.

Cathode

In the cathode 11, cathode active material layers 11B containing a cathode active material are formed on the two surfaces of a cathode current collector 11A. Examples of a material used for the cathode current collector 11A include metallic foil such as aluminum foil, nickel foil, and stainless steel foil.

The cathode active material layers 11B each contain, for example, a cathode active material, conducting agent, and binding agent. Examples of the cathode active material to be used include, depending on the type of an intended battery, metallic oxides, metallic sulfides, and certain polymers. In the case where a lithium ion battery is produced, for example, a composite oxide of lithium and transition metal is used, the composite oxide primarily including $Li_xMO_2$ (in this case, M represents at least one transition metal, x is determined depending on a charging and discharging state of the battery and is in the range from 0.05 to 1.10). Examples of the transition metal contained in the lithium composite oxide include cobalt (Co), nickel, and manganese (Mn).

Specific examples of such a lithium composite oxide include $LiCoO_2$, $LiNiO_2$, $LiMn_2O_4$, and $LiNi_yCo_{1-y}O_2$ ($0<y<1$). A solid solution in which elements of the transition metal are partially substituted with other elements may be also used. Examples of such a solid solution include $LiNi_{0.5}Co_{0.5}O_2$ and $LiNi_{0.8}Co_{0.2}O_2$. These lithium composite oxides can serve to generate a high voltage and exhibit high energy density.

Examples of the cathode active material include lithium-free metallic sulfides and metallic oxides, such as $TiS_2$, $MoS_2$, $NbSe_2$, and $V_2O_5$. These cathode active materials may be used alone or in combination of two or more.

Examples of the conducting agent include carbon materials such as black lead, carbon black, acetylene black, and ketjen black. These materials may be used alone or in combination of two or more. Any conducting material having conductivity may be used, such as metallic materials and conductive polymers.

Examples of the binding agent include synthetic rubbers such as a styrene butadiene rubber, fluorine-based rubber, and ethylene propylene diene rubber; and polymer materials such as polyvinylidene fluoride. These materials may be used alone or in combination of two or more.

The cathode 11 has the cathode lead 15 which is connected to one end of the cathode current conductor 11A by spot welding and ultrasonic welding. Although the cathode lead 15 is desirably formed by using metallic foil so as to have a mesh-like shape, any material which is electrochemically and chemically stable and which serves to form conduction may be used in place of the metallic material. Examples of the material used for the cathode lead 15 include aluminum and stainless steel.

Anode

In the anode 12, anode active material layers 12B containing an anode active material are formed on the two surfaces of an anode current collector 12A. Examples of a material used for the anode current collector 12A include metallic foil such as copper (Cu) foil, nickel foil, and stainless steel foil.

The anode activate layer 12B, for example, contains an anode active material and appropriately contains a conducting agent and binding agent. Examples of the anode active material include carbon materials which can be doped and dedoped with lithium metals, lithium alloys, or lithium and include composite materials of metallic materials and carbon materials. Specific examples of the carbon materials which can be doped and dedoped with lithium include graphitizable carbon, non-graphitizable carbon having lattice spacing of 0.37 nm or larger between (002) lattice planes, and graphite having lattice spacing of 0.34 nm or smaller between (002) lattice planes. In particular, such materials include pyrolytic carbons, cokes, glassy carbon fibers, calcined products of organic polymers, activated carbon, and carbon blacks. Among these, the cokes include pitch coke, needle coke, and petroleum coke. The calcined products of organic polymers are produced as a result of calcining a phenol resin or furan resin at appropriate temperature for carbonization. The carbon materials are significantly less likely to be subjected to the change of a crystal structure due to reception and emission of lithium ions, and high energy density and excellent cycling characteristics are therefore provided. Furthermore, the carbon materials can also serve as a conducting agent and are therefore preferably employed. The carbon materials may be in any of a fibrous form, spherical form, granular form, and a scale-like form.

Other examples of the materials which can be doped and dedoped with lithium include polymers such as polyacetylene and polypyrrole and oxides such as $SnO_2$.

In addition to the carbon materials, other examples of an anode material which can receive and emit lithium ions include a material which can receive and emit lithium ions and which contains at least any one of a metallic element and a metalloid element. Such a material is employed for the reason that a high energy density can be provided. Such an anode material may be a simple substance, an alloy, or a compound of the metallic element; a simple substance, an alloy, or a compound of the metalloid element; or a material having one or more phases thereof at least in part.

The term "alloy" as used herein refers to an alloy containing two or more metallic elements and also refers to an alloy containing one or more metallic elements and one or more metalloid elements. Furthermore, the alloy may contain a nonmetallic element. The alloy may have a state of a solid solution, eutectic crystal (eutectic mixture), or intermetallic compound or may have a state in which two or more of these states coexist.

Examples of the material containing the metallic element and metalloid element include lithium metals. Examples of the metallic element and metalloid element which can form an alloy with lithium include magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt).

A material containing at least one of metallic elements and metalloid elements of the group 14 in the long-form periodic table is preferably employed as the anode material which contains the metallic element or metalloid element which can form an alloy with lithium. A material containing at least any one of silicon and tin is particularly preferably employed for the reason that lithium ions can be received and emitted in a large amount and that high energy density can be provided.

Examples of the anode material containing at least any one of silicon and tin include simple substances, alloys, and compounds of silicon; simple substances, alloys, and compounds of tin; and materials having one or more phases thereof at least in part.

Examples of the alloys of silicon include alloys containing at least one metal selected from the group consisting of tin, nickel, copper, iron (Fe), cobalt, manganese, zinc, indium, silver, titanium (Ti), germanium, bismuth (Bi), antimony (Sb), and chromium (Cr) as a second element other than silicon. Examples of the compounds of silicon include compounds containing oxygen (O) and carbon (C). Such compounds may contain any of the above second elements in addition to silicon.

Examples of the alloys and compounds of silicon include $SiB_2$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), and LiSiO.

Examples of the alloys of tin include alloys containing at least one metal selected from the group consisting of silicon, nickel, copper, iron, cobalt, manganese, zinc, indium, silver, titanium, germanium, bismuth, antimony, and chromium as a second element other than tin. Examples of the compounds of tin include compounds containing oxygen and carbon. Such compounds may contain any of the above second elements in addition to tin. Examples of the alloys and compounds of tin include $SnO_w$ ($0<w\leq2$), $SnSiO_3$, LiSnO, and $Mg_2Sn$.

Separator

The heat-resistant microporous film 1 of the first embodiment can be used as the separator 13. The separator 13 is provided in the battery such that the heat-resistant layer 3 at least faces the cathode, in other words, such that the heat-resistant layer 3 is positioned between the cathode 11 and the substrate 2. By virtue of such a structure, the separator 13 can be protected from an oxidation environment and high temperature environment which are each generated in the vicinity of the cathode during high-voltage charging.

In the case where the non-aqueous electrolyte battery 20 is charged, for example, lithium ions are emitted from the cathode 11 and are then received by the anode 12 through the non-aqueous electrolyte contained in the separator 13. To the contrary, in the case of discharge, for example, the lithium ions are emitted from the anode 12 and are then received by the cathode 11 through the non-aqueous electrolyte contained in the separator 13.

Non-Aqueous Electrolyte

The electrolyte layer 14 contains a non-aqueous electrolyte solution and a polymer which serves to preserve the non-aqueous electrolyte solution and is in the form of gel. The non-aqueous electrolyte solution contains an electrolyte salt and a solvent in which the electrolyte salt is dissolved. Examples of the electrolyte salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate [$LiB(C_6H_5)_4$], lithium methanesulfonate ($LiCH_3SO_3$), lithium trifluoromethanesulfonate ($LiCF_3SO_3$), lithium tetrachloroaluminate ($LiAlCl_4$), lithium hexafluorosilicate ($Li_2SiF_6$), lithium chloride (LiCl), and lithium bromide (LiBr). These electrolyte salts may be used alone or in combination of two or more.

Examples of the solvent include lactone-based solvents such as γ-butyrolactone, γ-valerolactone, δ-valerolactone, and ε-caprolactone; carbonate-based solvents such as ethylene carbonate (EC), propylene carbonate (PC), butylene carbonate (BC), vinylene carbonate (VC), dimethyl carbonate (DMC), ethyl methyl carbonate (EMC), and diethyl carbonate (DEC); ether-based solvents such as 1,2-dimethoxyethane, 1-ethoxy-2-methoxyethane, 1,2-diethoxyethane, tetrahydrofuran, and 2-methyltetrahydrofuran; nitrile-based solvents such as acetonitrile; and non-aqueous solvents such as sulfolane-based solvents, phosphoric acids, phosphate solvents, and pyrrolidones. These solvents may be used alone or in combination of two or more.

The solvent preferably contains a compound which is produced as a result of substituting fluorine for part or all of hydrogen contained in a cyclic ester or chain ester. Examples of the fluorine-substituted compound include difluoroethylene carbonate(4,5-difluoro-1,3-dioxolane-2-one). Such a compound is employed for the following reason: even in the case of using the anode 12 in which compounds of silicon, tin, and germanium are contained as the anode active material, charge-discharge cycle characteristics can be enhanced, and difluoroethylene carbonate particularly serves to provide an excellent effect in which the charge-discharge cycle characteristics are enhanced.

Any polymer that absorbs the solvent for gelation can be employed, and examples of such a polymer include fluorine-based polymers such as a copolymer of polyvinylidene fluoride or vinylidene fluoride (VdF) with hexafluoropropylene (HEP), ether-based polymers such as polyethylene oxide (PEO) and cross-linked products containing polyethylene oxide, compounds containing a repeating unit such as polyacrylonitrile (PAN), polypropylene oxide (PPO), or polymethylmethacrylate (PMMA). These polymers may be used alone or in combination of two or more.

Among these, in terms of redox stability, fluorine-based polymers are preferably employed. In particular, a copolymer containing vinylidene fluoride and hexafluoropropylene is preferably employed. In addition, such a copolymer may contain a monoester of unsaturated dibasic acid, such as monomethyl maleate (MME); halogenated ethylene such as chlorotrifluoroethylene (PTCFE); a cyclic carbonate of an unsaturated compound, such as vinylene carbonate; or an acrylvinyl monomer containing an epoxy group. By virtue of using such a copolymer, advantageous characteristics can be further enhanced.

2-2. Production Process of Non-Aqueous Electrolyte Battery

Production Process of Cathode

The cathode active material, binding agent, and conducting agent are mixed to prepare a cathode mixture, and the cathode mixture is dispersed in a solvent such as N-methyl-2-pyrrolidone, thereby preparing cathode mixture slurry. The cathode mixture slurry is applied onto the cathode current collector 11A and is then dried, and the resultant product is then subjected to compression molding, for example, with a roll press machine to form the cathode active material layer 11B, thereby producing the cathode 11.

Production Process of Anode

The anode active material and binding agent are mixed to prepare an anode mixture, and the anode mixture is dispersed in a solvent such as N-methyl-2-pyrrolidone, thereby preparing anode mixture slurry. The anode mixture slurry is applied onto the anode current collector 12A and is then dried, and the resultant product is then subjected to compression molding, for example, with a roll press machine to form the anode active material layer 12B, thereby producing the anode 12.

In the case where a metallic or alloy anode is formed, a gas-phase method, liquid-phase method, thermal spraying method, or firing method can be employed. In the case where two or more of these methods are used, the anode current collector 12A and anode active material layer 12B are preferably alloyed at an interface therebetween at least in part. In particular, it is preferable that the elements contained in the anode current collector 12A diffuse into the anode active material layer 12B at the interface, that the elements contained in the anode active material layer 12B diffuse into the anode current collector 12A at the interface, or that the elements individually contained in the anode current collector 12A and anode active material layer 12B diffuse into the opposite sides at the interface. Such a configuration is employed for the reason that destruction caused by the expansion and shrinkage of the anode active material layer 12B due to charge and discharge can be suppressed and that electric conduction between the anode active material layer 12B and anode current collector 12A can be enhanced.

Examples of the gas-phase method include a physical deposition method and chemical deposition method and specifically include a vacuum evaporation method, sputtering method, ion plating method, laser ablation method, chemical vapor deposition (CVD) method, and plasma chemical vapor deposition method. Examples of the liquid-phase method include typical methods such as electroplating and nonelectrolytic plating. In the firing method, for example, particles of the anode active material are mixed with the binding agent or the like and are then dispersed in a solvent, and the resultant product is applied and is then thermally treated at a temperature higher than the melting point of the binding agent or the like. Examples of the firing method include typical methods such as an atmosphere firing method, reaction firing method, and hot-press firing method.

Assembling Process of Non-Aqueous Electrolyte Battery

The non-aqueous solvent, electrolyte salt, and solvent to be optionally used are mixed, thereby preparing a precursor solution. The precursor solution is applied onto surfaces of the cathode 11 and anode 11, and the solvent is then volatilized to form the gel-like electrolyte layer 14. The cathode lead 15 and the anode lead 16 are then attached to the cathode current collector 11A and the anode current collector 12A, respectively. In this case, the cathode lead 15 and the anode lead 16 may be attached to the cathode current collector 11A and the anode current collector 12 in advance of the formation of the electrolyte layer 14, respectively.

The cathode 11 and anode 12 on which the electrolyte layers 14 have been each formed are stacked such that the separator 13 is interposed therebetween, and the stacked structure is then wound in a longer direction. A protection tape is adhesively applied onto the outermost periphery of the resultant product, thereby producing the wound electrode body 10. In this case, the heat-resistant microporous film 1 of the first embodiment is used as the separator 13.

The wound electrode body 10 is then, for example, placed between two film-like exterior members, and the edges of the exterior members are subsequently allowed to adhere to each other by thermal fusion bonding or the like and are then sealed under reduced pressure, thereby encapsulating the wound electrode body 10. In this process, adhesion films 17 are provided between the exterior member and each of the cathode lead 15 and anode lead 16, thereby completing the production of the non-aqueous electrolyte battery 20.

EXAMPLES

Embodiments of the present disclosure will be hereinafter described in more detail with reference to examples and comparison examples.

In the examples, microporous films were individually produced in a manner in which the thickness of the heat-resistant particle layer and the size of the heat-resistant particles were changed, and the thermal shrinkage of the microporous films was measured.

Example 1

A polyvinylidene fluoride (PVdF) resin and N-methyl-2-pyrrolidone (NMP) each having a weight-average molecular weight of 1000000 were mixed in a weight ratio of PVdF: NMP=10:90. The polyvinylidene fluoride was sufficiently dissolved in the N-methyl-2-pyrrolidone, thereby preparing a polyvinylidene fluoride solution in which the polyvinylidene fluoride was dissolved in an amount of 10 weight %.

Fine powder of alumina [$Al_2O_3$, Sumicorundum (registered trademark) AA-03 commercially available from Sumitomo Chemical Company, Limited] having an average particle size of 500 nm was added as an inorganic material to the polyvinylidene fluoride solution in a weight of 20 times the weight of the polyvinylidene fluoride. The resultant product was then stirred with a bead mill, thereby preparing application slurry.

The application slurry was then applied onto a substrate as a polyethylene microporous film (commercially available from TonenGeneral Sekiyu K.K.) having a thickness of 12 μm with a table coater, and the resultant product was immersed into a water bath for 15 minutes, thereby causing phase separation in the polyvinylidene fluoride. The resultant product was then dried by the blowing of hot air, thereby forming a heat-resistant layer. Furthermore, a heat-resistant layer was additionally formed on the other surface of the substrate in the same manner. Through these processes, a microporous film was formed as an alumina-supported resin layer so as to have the heat-resistant layers each having a thickness of 2.25 μm and having a thickness of 4.5 μm in total.

In the microporous film produced in this manner, the heat-resistant layers had a total thickness of 9.0 times the average particle size of the heat-resistant particles contained in the heat-resistant layers.

A three-dimensional non-contact surface profile-measuring system was used to analyze the three-dimensional profile of a surface of the heat-resistant layer of the microporous film, thereby measuring the number of protrusions and measuring the areas of the protrusions viewed from the above, the protrusions projecting from a height average surface within an area of 0.0418 mm² at a height of 1 μm or higher. On the basis of the measurement results, the surface flatness of the heat-resistant layer was evaluated. The measurement was conducted three times, and the average of the values obtained from the measurement was employed. In this case, the height average surface was defined as the average height of the measuring surface (the average thickness of the heat-resistant layer within a measurement-conducted surface area of 0.0418 mm²).

In the measurement, a surface profile-measuring system (Surface Explorer type SX-520DR commercially available from Ryoka Systems Inc.) was used. With this system, the three-dimensional profile data of a surface of the separator was first analyzed in a wave operation mode. In this case, a 20-poser objective lens was used, thereby being able to analyze the surface profile of an area of 0.0418 mm² (237 μm×176.5 μm). An analysis program "particle analysis" of an analysis software SX-Viewer was executed to the obtained data. On the basis of an appropriate height from a height average surface, a portion lower than such a height and a portion higher than that are discriminated as a result of binarization, thereby being able to display an image projected to a plane. In this case, the appropriate height from a height average surface was determined as 1 μm which was height of at least twice the average particle size of the heat-resistant particles. Finally, the areas and number of the protrusions on the image projected to plane were measured.

In the surfaces of the heat-resistant layers which had been subjected to the measurement in this manner, 13.3 protrusions were found in number and had an area of 31.3 μm².

Example 2

The heat-resistant layers were individually formed on the two surfaces of the substrate such that one heat-resistant layer had a thickness of 1.55 μm and such that the heat-resistant layers had a thickness of 3.1 μm in total. Except such a process configuration, a microporous film having the heat-resistant layers was produced in the same manner as employed in the example 1.

In the microporous film produced in this manner, the heat-resistant layers had a total thickness of 6.2 times the average particle size of the heat-resistant particles contained in the heat-resistant layers. In addition, in the surfaces of the heat-resistant layers, 20.7 protrusions were found in number and had an area of 46.1 μm².

Example 3

The heat-resistant layers were individually formed on the two surfaces of the substrate such that one heat-resistant layer had a thickness of 2.75 μm and such that the heat-resistant layers had a thickness of 5.5 μm in total. Except such a process configuration, a microporous film having the heat-resistant layers was produced in the same manner as employed in the example 1.

In the microporous film produced in this manner, the heat-resistant layers had a total thickness of 11.0 times the average particle size of the heat-resistant particles contained in the heat-resistant layers. In addition, in the surfaces of the heat-resistant layers, 1.4 protrusions were found in number and had an area of 1.0 μm².

Example 4

In place of the bead mill, a Dispermill was used for the stirring in the preparation of the application slurry. In addition, the heat-resistant layers were individually formed on the two surfaces of the substrate such that one heat-resistant layer had a thickness of 2.75 μm and such that the heat-resistant layers had a thickness of 5.5 μm in total. Except such process configurations, a microporous film having the heat-resistant layers was produced in the same manner as employed in the example 1.

In the microporous film produced in this manner, the heat-resistant layers had a total thickness of 11.0 times the average particle size of the heat-resistant particles contained in the heat-resistant layers. In addition, in the surfaces of the heat-resistant layers, 57.2 protrusions were found and had an area of 483.9 μm².

Comparison Example 1

In the preparation of the application slurry, the bead mill was not used, and a container into which the polyvinylidene fluoride solution and alumina had been put was shaken for the stirring. In addition, the heat-resistant layers were individually formed on the two surfaces of the substrate such that one heat-resistant layer had a thickness of 2.75 μm and such that the heat-resistant layers had a thickness of 5.5 μm in total. Except such process configurations, a microporous film having the heat-resistant layers was produced in the same manner as employed in the example 1.

In the microporous film produced in this manner, the heat-resistant layers had a total thickness of 11.0 times the average particle size of the heat-resistant particles contained in the heat-resistant layers. In addition, in the surfaces of the heat-resistant layers, 76.8 protrusions were found in number and had an area of 4445.1 μm².

Evaluation of Separator

Thermal Shrinkage

The separator produced in each of the examples 1 to 4 and comparison example 1 was cut out in lengths of 60 mm in a machine direction (MD) and transverse direction (TD), thereby producing a specimen. The specimen was preserved for one hour in a constant temperature bath in which a temperature was adjusted to a level of 90° C. The specimen was then retrieved and was subsequently allowed to stand at room temperature for cooling. The length of the resultant product was then measured. The length measurement of the specimen was conducted in the MD and TD.

The thermal shrinkage in each of the MD and TD was then calculated from the following formula.

Thermal shrinkage (%)={[length before thermal preservation (60)−length after thermal preservation]/length before thermal preservation (60)}×100

The thermal shrinkage in the MD was compared with the thermal shrinkage in the TD, and the larger value was employed as the thermal shrinkage in the separator.

The measurement results are listed in Table 1.

|  | Total thickness [μm] | Average particle size of heat-resistant particles [nm] | Thickness/particle size | Surface flatness | | Thermal shrinkage [%] |
| --- | --- | --- | --- | --- | --- | --- |
|  |  |  |  | Protrusion numbers | Protrusion area [μm$^2$] |  |
| Example 1 | 4.5 | 500 | 9.0 | 13.3 | 31.3 | 2.5 |
| Example 2 | 3.1 | 500 | 6.2 | 20.7 | 46.1 | 2.8 |
| Example 3 | 5.5 | 500 | 11.0 | 1.4 | 1.0 | 2.3 |
| Example 4 | 5.5 | 500 | 11.0 | 57.2 | 483.9 | 2.8 |
| Comparison example 1 | 5.5 | 500 | 11.0 | 76.8 | 4445.1 | 3.5 |

As is obvious from Table 1, in the case where 60 or smaller number of protrusions were formed on the heat-resistant layers under the above measurement conditions so as to have an area of 500 μm$^2$ or smaller, the thermal shrinkage was reduced, the protrusion being formed as the result of aggregation of the fine particles.

Furthermore, in the case where the heat-resistant layers had a total thickness of at least six times the average particle size of the heat-resistant particles, the heat shrinkage was reduced. As is obvious from each of the examples 3 and 4 and comparison example 1, even in the case where the ratio of the total thickness of the heat-resistant layers to the average particle size of the heat-resistant particles exceeded the defined value, difficulty to decrease the thermal shrinkage arose in the presence of the large number of protrusions and excessively large protrusions.

These results provided the following finding: the number and area of the coarse aggregates of particles were decreased with the result that thermal shrinkage could be suppressed.

Although embodiments of the present disclosure have been described with reference to the above embodiments and examples, embodiments of the present disclosure are not limited to the above embodiments and examples. Embodiments of the present disclosure can be variously modified within the scope of the present disclosure. In the case where the microporous film is used as a battery separator, for example, the thickness of the microporous film and composition of materials may be appropriately determined depending on the configurations of a cathode and anode.

The battery of the second embodiment has been described merely as an example. The heat-resistant microporous film of embodiments of the present disclosure can be applied to various types of batteries, such as cylindrical, square, stacked, and coin batteries.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention is claimed as follows:

1. A heat-resistant microporous film comprising:
a substrate comprising a porous film; and
a heat-resistant layer formed on at least one surface of the substrate, the heat-resistant layer containing a heat-resistant resin and heat-resistant particles, wherein:
at least one protrusion is formed on a surface of the heat-resistant layer, a total number of protrusions not exceeding 60 per surface area of 0.0418 mm$^2$,
a total area of the protrusions is 500 μm$^2$ or less per surface area of 0.0418 mm$^2$ in a direction normal to a surface of the heat-resistant layer, each protrusion being formed as a result of aggregation of the heat-resistant particles, and
a height of each protrusion is at least twice an average particle size of the heat-resistant particles with reference to a height average surface of the heat-resistant layer.

2. The heat-resistant microporous film according to claim 1, wherein the heat-resistant particles are in a granular form.

3. The heat-resistant microporous film according to claim 2, wherein the heat-resistant layer has a thickness of at least six times the average particle size of the heat-resistant particles.

4. The heat-resistant microporous film according to claim 1, wherein the heat-resistant particles include insulating inorganic particles.

5. The heat-resistant microporous film according to claim 4, wherein the heat-resistant particles include at least one material selected from the group consisting of alumina (Al$_2$O$_3$), magnesia (MgO), titania (TiO$_2$), zirconia (ZrO$_2$), and silica (SiO$_2$).

6. The heat-resistant microporous film according to claim 4, wherein a content of the heat-resistant particles in the heat-resistant layer ranges from 80 volume % to 90 volume %.

7. The heat-resistant microporous film according to claim 1, wherein the porous film includes a polyolefin-based resin.

8. The heat-resistant microporous film according to claim 1, wherein at least one of a melting point and a glass transition temperature of the heat-resistant resin is at least 180° C.

9. The heat-resistant microporous film according to claim 8, wherein the heat-resistant resin includes polyvinylidene fluoride.

10. The heat-resistant microporous film according to claim 1, wherein a thickness of the heat-resistant layer ranges from 3 μm to 6 μm.

11. The heat-resistant microporous film according to claim 1, wherein a porosity of the heat-resistant layer ranges from 60% to 70%.

12. The heat-resistant microporous film according to claim 1, wherein a weight ratio of heat resistant particles to the heat-resistant resin in the heat-resistant layer is approximately 20:1.

13. A battery separator comprising:
a substrate comprising a porous film; and
a heat-resistant layer formed on at least one surface of the substrate, the heat-resistant layer containing a heat-resistant resin and heat-resistant particles, wherein:
at least one protrusion is formed on a surface of the heat-resistant layer, a total number not exceeding 60 per surface area of 0.0418 mm$^2$,
a total area of the protrusions is 500 μm$^2$ or less per surface area of 0.0418 mm$^2$ in a direction normal to a surface of the heat-resistant layer, the protrusion being formed as a result of aggregation of the heat-resistant particles, and
a height of each protrusion is at least twice an average particle size of the heat-resistant particles with reference to a height average surface of the heat-resistant layer.

14. The battery separator according to claim 13, wherein the heat-resistant particles are in a granular form.

15. The battery separator according to claim 13, wherein the heat-resistant layer has a thickness of at least six times the average particle size of the heat-resistant particles.

16. The battery separator according to claim 13, wherein the heat-resistant particles include insulating inorganic particles.

17. The battery separator according to claim 16, wherein the heat-resistant particles include at least one material selected from the group consisting of alumina ($Al_2O_3$), magnesia (MgO), titania ($TiO_2$), zirconia ($ZrO_2$), and silica ($SiO_2$).

18. The battery separator according to claim 16, wherein a content of the heat-resistant particles in the heat-resistant layer ranges from 80 volume % to 90 volume %.

19. The battery separator according to claim 13, wherein the porous film includes a polyolefin-based resin.

20. The battery separator according to claim 13, wherein at least one of a melting point and a glass transition temperature of the heat-resistant resin is at least 180° C.

21. The battery separator according to claim 20, wherein the heat-resistant resin includes polyvinylidene fluoride.

22. The battery separator according to claim 13, wherein a thickness of the heat-resistant layer ranges from 3 μm to 6 μm.

23. The battery separator according to claim 13, wherein a porosity of the heat-resistant layer ranges from 60% to 70%.

24. The battery separator according to claim 13, wherein a weight ratio of heat resistant particles to the heat-resistant resin in the heat-resistant layer is approximately 20:1.

* * * * *